June 20, 1961 R. W. HESSINGER ET AL 2,989,683
POWER SUPPLY PARTICULARLY FOR AUTOMATIC FAULT LOCATOR
Original Filed Aug. 6, 1956
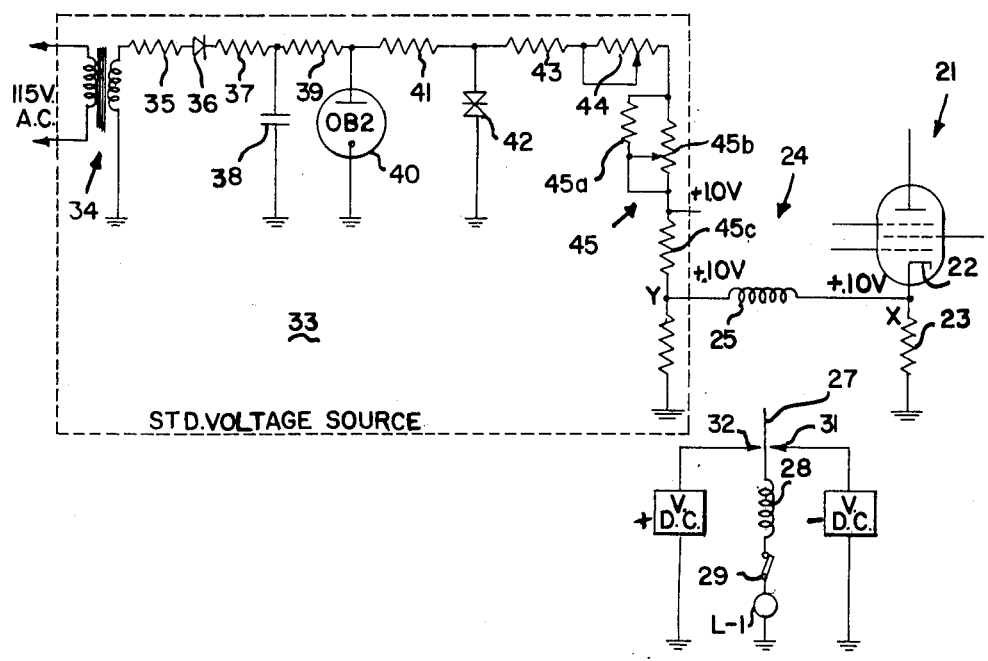
INVENTOR
RICHARD W. HESSINGER
BY WILLIAM KELLY
*Toulmin & Toulmin*
ATTORNEYS _United States Patent Office_

2,989,683
Patented June 20, 1961

2,989,683
POWER SUPPLY PARTICULARLY FOR AUTOMATIC FAULT LOCATOR
Richard W. Hessinger and William Kelly, Dayton, Ohio, assignors to The Commonwealth Engineering Company of Ohio, Dayton, Ohio, a corporation of Ohio
Original application Aug. 6, 1956, Ser. No. 602,350. Divided and this application Apr. 7, 1958, Ser. No. 730,739
3 Claims. (Cl. 321—16)

This invention relates to devices capable of being used in devices for detecting faults in electrical or electronic equipment. This application is a division of Serial No. 602,350, filed August 6, 1956. The invention is particularly directed to devices for regulating a D.C. voltage to be taken from an A.C. voltage source. Thus for example the apparatus of invention is capable of being used for automatic fault locators indicating the operating conditions of radar sets, sound transmission equipment, computers, automation circuits, strain gauge apparatus, receiving and transmitting equipment and similar electric and electronic mechanism.

A principal object of the invention is the provision of ultra stable regulated power supplies which are effective to provide stabilized voltages for comparison with voltages at monitored points of the equipment to be checked; a particular feature of the specific stabilized power supply of invention is that vacuum tubes are not employed in the standard power supply.

The standard voltage reference source, as preferred embodiment in the practice of the invention it is suggested to employ an extremely well regulated current power supply involving the use, in combination, of a shunt gaseous tube regulator and a shunt semiconductor regulator device. This standard ultra stable regulated power supply is utilized to effect a comparison with voltages at monitored points within the apparatus under examination by a fault locator. The magnitude of the standard voltage is limited in accordance with the invention by several factors including:

(1) The amount of the series resistance required in the monitored circuit across which a voltage equal to the standard voltage is developed. The standard voltage must be matched with a similar voltage from the measured circuit and normally a very large resistance would be required in series with a cathode, for example, and with other circuits under measurement if the standard voltage level is high; since such might of itself lead to malfunction of the device under test, in the practice of this invention the standard voltage is maintained low; and (2) The null detector current is a factor in the sensitivity of a null detector to be used in an automatic fault locator related to the value of the reference voltage.

The invention will be more fully understood by reference to the following detailed description and accompanying drawing wherein the single figure is a schematic illustration of an apparatus in accordance with the present invention.

Referring now to the single figure, the numeral 21 generally designates a tube, a circuit of which is under test by an automatic fault locator (not shown). The cathode 22 of this tube is provided in the cathode lead thereof with resistor 23 of fixed predetermined value which provides a normal operating voltage at the point X. In the instance under consideration the resistor has been chosen to have a value of 46$^{06}$ ohms and the normal operating voltage at X is +0.10 v.

The numeral 24 generally designates a null indicator. The null indicator or meter relay includes a signal coil 25, needle 27, lock coil 28, contact points 31 and 32. The locking coil circuit is completed to ground through reset switch 29 and an indicating light L–1, there being only one number light since there is only one point to be monitored. The meter needle is movable between contact points schematically indicated at 31 and 32. Contact 31 is connected to ground through a negative D.C. voltage, while contact 32 is connected to ground through a positive D.C. voltage. These voltages may suitably have a value of about 6–8 volts to provide for energizing locking coil 28 and indicator light L–1.

One end of the signal coil 25 is directly connected to the point X which is to be monitored. The second side of the signal coil 25, shown leftwardly in FIGURE 1, is connected to a voltage source designated generally by the numeral 33. This standard voltage source is connected to line voltage through a transformer 34 which is preferably adapted for operation on an input power of 115 volts A.C. at 50 to 450 cycles. The standard voltage source includes current limiting resistor 35, rectifier 36, filter resistor 37, filter capacitor 38, filter resistor 39, a type OB2 gas filled cold cathode tube 40; filter resistor 41 is connected to tube 40 and to a semi-conductor diode 42 which is preferably an A6C siliconductor. This latter combination provides a cascaded circuit of high stability; the siliconductor is operated under conditions commonly identified as the Zener voltage region and will provide a constant D.C. voltage for a very large change in siliconductor current.

Dropping resistor 43 is connected to the potentiometer 44 which forms a portion of a voltage divider generally designated at 45 having values as shown; the divider 45 includes a resistor 45a which provides a linear adjustment for the setting of the voltage at point Y. The divider 45, as may be seen from the drawing, also includes precision resistors 45b, 45c, which provide constant positive voltages, in the instance of the figure, of values of 1.0 volt and .10 of a volt.

In the illustration set out in the single figure, the coil 25 is connected to the point Y which has a constant voltage value of plus 0.10.

In the operation of the device of the figure, if the current through the tube 21 either increases or decreases then the voltage across the resistor 23 will either increase or decrease; when this voltage changes, current will pass either from or to the point X through the signal coil of the meter relay to or from the standard voltage source.

Current through the signal coil 25 of the meter relay causes the needle 27 to swing to make contact with the plus or minus D.C. locking voltage, thus energizing the locking coil 28 of the meter relay. This energizes the indicator light L–1 and will denote a fault at point X. The meter will remain locked until the reset switch 29 is operated manually to open the circuit.

It is to be noted that the sensitivity of the null detector is an important consideration in determining how much of a voltage variation may exist prior to actuation of the indicator light L–1. In the device shown, visual inspection of the needle provides the necessary information as to whether the voltage at point X is high or low.

It will be understood that this invention is susceptible to modification in order to adapt it to different usages and conditions and accordingly, it is desired to comprehend such modifications within this invention as may fall within the scope of the appended claims.

We claim:
1. In a regulator for providing a regulated D.C. output, a plurality of precision resistors connected in series forming a string and having output terminals, one of which is adapted to be grounded and the other of which is adapted to have an input D.C. voltage applied thereto, a semi-conductor diode in parallel with the resistor string and operating in the Zener voltage region, said semi-conductor diode having a grounded terminal, a cold cathode tube having a grounded cathode and also in parallel with the resistor string, a filter resistor in series with the resistor string and connected electrically between the said semiconductor diode and said cold cathode tube, a diode rectifier in series with the resistor string and said filter resistor, a four terminal filter connected between the rectifier and said filter resistor, and a transformer for connection to a source of A.C. voltage and having input terminals to the regulator, one of which is adapted to be grounded and the other of which is electrically connected with the input to the said diode rectifier, said resistor string having a plurality of taps between the resistors of the string.

2. In a regulator for providing a regulated D.C. output form an A.C. source, a transformer for connection to the A.C. source and the secondary of which transformer has input terminals to the regulator, a plurality of precision resistors forming a resistor string and said string having output terminals of the regulator across which the D.C. output of the regulator is taken, a common electrical connection of the regulator to which one of said input terminals and one of said output terminals is connected, a diode rectifier in electrical series with another of said input terminals and another of said output terminals and in series electrically with said resistor string, a low pass filter having four terminals and its input terminal electrically connected to the output terminal of said diode rectifier, a cold cathode tube having its cathode connected to said common electrical connection and its plate connected to the output terminal of said filter, a filter resistor commonly connected to said cold cathode tube plate and to the output terminal of said filter, a semi-conductor diode operating in the Zener voltage region and connected between said filter resistor output and said common electrical connection, a dropping resistor commonly connected to said filter resistor output and said semi-conductor diode, a potentiometer electrically connected between the output of said dropping resistor and the input of said resistor string, and said resistor string having a plurality of taps between the resistors of the string.

3. In a regulator for providing a regulated D.C. output from an A.C. source, a transformer for connection to the A.C. source and the secondary of which transformer has input terminals to the regulator, a plurality of precision resistors forming a resistor string and said string having output terminals of the regulator across which the D.C. output of the regulator is taken, a common electrical connection of the regulator to which one of said input terminals and one of said output terminals is connected, a diode rectifier in electrical series with another of said input terminals of the regulator and another of said output terminals of the regulator and in series electrically with said resistor string, a current limiting resistor connected electrically between said latter input terminal of the transformer and the input terminal of said diode rectifier, a low pass filter having four terminals and its input terminal electrically connected to the output terminal of said diode rectifier, a cold cathode tube having its cathode connected electrically to said common electrical connection and its plate connected to the output terminal of said filter, a filter resistor commonly connected to said cold cathode tube plate and to the output terminal of said filter, a semi-conductor diode operating in the Zener voltage region and connected electrically between said filter resistor output and said common electrical connection, a dropping resistor commonly connected to said filter resistor output and said semi-conductor diode, a voltage divider including a potentiometer electrically connected between the output of said dropping resistor and the input of said resistor string, and said resistor string having a plurality of taps between the resistors of the string.

References Cited in the file of this patent
UNITED STATES PATENTS

| | | |
|---|---|---|
| 2,581,124 | Moe | Jan. 1, 1952 |
| 2,697,201 | Harder | Dec. 14, 1954 |
| 2,769,137 | Creusere | Oct. 30, 1956 |
| 2,852,729 | Kern | Sept. 16, 1958 |